(12) United States Patent
Livingston et al.

(10) Patent No.: US 11,807,130 B2
(45) Date of Patent: Nov. 7, 2023

(54) BATTERY EXCHANGE AND CHARGING SYSTEM FOR DRONES

(71) Applicant: SKYYFISH LLC, Stevensville, MT (US)

(72) Inventors: John Richard Livingston, Stevensville, MT (US); Orest Jacob Pilskalns, Missoula, MT (US)

(73) Assignee: SKYYFISH, LLC, Stevensville, MT (US)

( * ) Notice: Subject to any disclaimer, the term of this patent is extended or adjusted under 35 U.S.C. 154(b) by 439 days.

(21) Appl. No.: 17/325,797

(22) Filed: May 20, 2021

(65) Prior Publication Data

US 2021/0380019 A1   Dec. 9, 2021

(51) Int. Cl.
| | |
|---|---|
| *B60L 53/80* | (2019.01) |
| *B64U 50/19* | (2023.01) |
| *B60L 53/14* | (2019.01) |
| *B60L 58/12* | (2019.01) |
| *B64C 39/02* | (2023.01) |
| *B60L 53/30* | (2019.01) |

(52) U.S. Cl.
CPC ............. *B60L 53/80* (2019.02); *B60L 53/14* (2019.02); *B60L 53/30* (2019.02); *B60L 58/12* (2019.02); *B64C 39/024* (2013.01); *B64U 50/19* (2023.01)

(58) Field of Classification Search
CPC ................................. B60L 53/80; B64U 50/39
See application file for complete search history.

(56) References Cited

U.S. PATENT DOCUMENTS

| | | | |
|---|---|---|---|
| 10,407,182 B1 * | 9/2019 | Alcorn | B64U 10/30 |
| 2014/0319272 A1 | 10/2014 | Casado Magana et al. | |
| 2017/0207640 A1 * | 7/2017 | Wang | H02J 7/0063 |
| 2017/0283090 A1 | 10/2017 | Miller et al. | |
| 2018/0093768 A1 | 4/2018 | Castleman et al. | |
| 2018/0312069 A1 * | 11/2018 | McClymond | B60L 53/51 |
| 2019/0315235 A1 * | 10/2019 | Kung | B64C 39/024 |
| 2020/0133286 A1 * | 4/2020 | Bellar | B60L 50/75 |

FOREIGN PATENT DOCUMENTS

| | | | | |
|---|---|---|---|---|
| CA | 3044557 A1 * | 5/2018 | .......... | B60L 11/1838 |
| CN | 104973263 B | 3/2017 | | |
| CN | 207842906 U | 9/2018 | | |
| CN | 110979091 A | 4/2020 | | |

(Continued)

OTHER PUBLICATIONS

Written Opinion of the International Search Authority for PCT/US2021/033403.

*Primary Examiner* — Christopher P Ellis
(74) *Attorney, Agent, or Firm* — Obi Iloputaife, Esq.

(57) ABSTRACT

To replace a depleted battery in a drone with a fresh battery, the drone first lands on the exchange and charging system, aligned between two battery holders. A freshly charged battery, in a docking bay in one battery holder, is then moved against the drone's depleted battery. The depleted battery, in turn, is moved out of the drone into the other battery holder, and the fresh battery takes its place. While in the battery holders, the batteries are charged. After a battery exchange, the battery holders track round so that another battery and vacant docking bay are brought into place for a subsequent exchange.

24 Claims, 5 Drawing Sheets

(56) References Cited

FOREIGN PATENT DOCUMENTS

| | | | | |
|---|---|---|---|---|
| CN | 111776240 A | * | 10/2020 | |
| CN | 112278276 A | * | 1/2021 | .............. B60L 53/80 |
| EP | 2644438 B1 | | 2/2019 | |
| GB | 2572549 A | * | 10/2019 | .............. B60L 50/50 |
| GB | 2615734 A | * | 8/2023 | .............. B64C 29/00 |
| KR | 102169350 B1 | * | 2/2018 | |
| KR | 20190012021 A | * | 6/2019 | |
| KR | 20200074423 A | * | 7/2020 | |
| KR | 20210089301 A | * | 8/2021 | |
| WO | WO-2019186118 A1 | * | 10/2019 | .............. B60L 50/50 |

* cited by examiner

BATTERY EXCHANGE AND CHARGING SYSTEM FOR DRONES

TECHNICAL FIELD

This application relates to drones. In particular, it relates to systems and methods for automated drone battery exchange.

BACKGROUND

Unmanned Aerial Vehicles (UAVs), also known as drones, have become commonplace in our society these days. While millions of consumers worldwide own and use drones for fun and taking pictures of various targets, commercial drone applications are still evolving and have not yet reached a critical mass, partly because of the user inconvenience of having to manually change drone batteries.

One of the key applications for commercial drones is package or food delivery. Another category of applications is in surveillance. This includes use cases in law enforcement, private security, the military, fire and safety. The object is to quickly dispatch a drone to a target destination to obtain visual insights and intelligence ("eyes") at the scene of an accident, fire, shooting, rescue situation, target incident or other event. One of the major obstacles to commercial drones being widely deployed is the absence of a low cost, effective, integrated remote landing pad that functions as a battery exchange system and a charging station.

This background is not intended, nor should be construed, to constitute prior art against the present invention.

SUMMARY OF INVENTION

A drone lands on the battery exchange and charging system (BECS), aligned between two battery holders. A freshly charged battery, in a docking bay in one battery holder, is then pushed or otherwise moved against the drone's depleted battery. The depleted battery, in turn, is pushed or otherwise moved out of the drone into the other battery holder, and the fresh battery takes its place. While in the battery holders, the batteries are charged. After a battery exchange, the battery holders track round so that another battery and vacant docking bay are brought into place for a subsequent exchange.

This invention intends to automate the exchanging of drone batteries and in turn facilitate a growth in the commercial drone adoption rate.

The BECS may enable the mass deployment of drones across both large urban and rural areas. A network of these BECSs also could be known as drone repowering stations and could extend and facilitate the flying service coverage area of a drone network out to as far as the BECSs are stationed. For example, if the drone network were to space out a BECS station equally for every 10 square miles, it would take approximately 10 BECS stations placed evenly every 10 miles to enable fresh battery exchange and allow for drone flight coverage of the hundred square miles target area. The BECS enables drones to land at a very specific location, automatically swap old or empty batteries for new or full power ones, and then recharge the old batteries to make them ready for redeployment via the system.

Through this BECS, drones can fly all kinds of missions and when their battery gets low, quickly land at the designated landing pad, and quickly swap out a depleted battery for a freshly charged one. The BECS then recharges the depleted battery and prepares it as a freshly charged battery ready for exchanging into the next drone that lands with a depleted battery. This way, depleted batteries have an easy way of becoming charged remotely and reused many times, while still able to hold a charge. With today's technology, batteries are able to hold about 500 recharging cycles before starting to degrade. We anticipate batteries, with current battery technology advancement, being able to increase the number of their recharging cycles over time.

One purpose of this invention is provide a way of remotely swapping a drone's battery without human intervention or human presence, and repeat the process for the same or other drones. In other words, it works completely "hands free" and independently of physical on-site touch by a human. The remote BECS is fully autonomous and robotic. This may also enable the drones to fly almost 24 hours a day, 7 days a week, and carry out many tasks across a wide geographical expanse, particularly if multiple BECSs or a BECS network is used.

The BECS may facilitate drones to be remotely controlled by a master control centre much like an air traffic control or typical monitoring centre. At the master control centre the drones are dispatched, location tracked and monitored to carry out specific tasks which include but are not limited to: rescue and safety; surveillance; package and food delivery; infrastructure inspections; surveying; construction management; crop spraying; power-line, gas line, pipeline inspections; monitoring with a variety of sensors; photography and cinematography and countless other applications. The BECS may typically be mounted or a rooftop or a cell tower within an urban or rural location, but could also be mounted on a mobile police, fire or government vehicle or on a delivery vehicle.

The BECS enables drones to quickly swap empty or low batteries for new fully charged batteries while flying en-route to a target destination.

Disclosed is a drone battery exchange system comprising: a first battery holder with multiple, movable docking bays each dimensioned to accept a battery module; a second battery holder with multiple, movable docking bays each dimensioned to accept a similar battery module; a surface upon which a drone with a depleted battery module can land, wherein the first and second battery holders and the surface are positioned so that a sequence of one of the docking bays of the first battery holder, the depleted battery module and one of the docking bays of the second battery holder can be aligned on an axis; and a mechanism that moves a freshly charged battery module from the aligned docking bay in the first battery holder into the drone and simultaneously causes the depleted battery module to enter the aligned docking bay of the second battery holder.

Also disclosed is a method of exchanging a drone battery comprising: landing a drone with a depleted battery module on a surface of a drone battery exchange system comprising: a first battery holder with multiple, movable docking bays each dimensioned to accept a battery module; and a second battery holder with multiple, movable docking bays each dimensioned to accept a similar battery module; aligning, in sequence on a horizontal axis, one of the docking bays of the first battery holder that hosts a freshly charged battery module, the depleted battery module and an empty one of the docking bays of the second battery holder; and operating a mechanism that moves the freshly charged battery module into the drone, and simultaneously causes the depleted battery module to enter the aligned docking bay of the second battery holder.

BRIEF DESCRIPTION OF DRAWINGS

The following drawings illustrate embodiments of the invention and should not be construed as restricting the scope of the invention in any way.

DETAILED DESCRIPTION

A. Exemplary Embodiments

Figure 1:
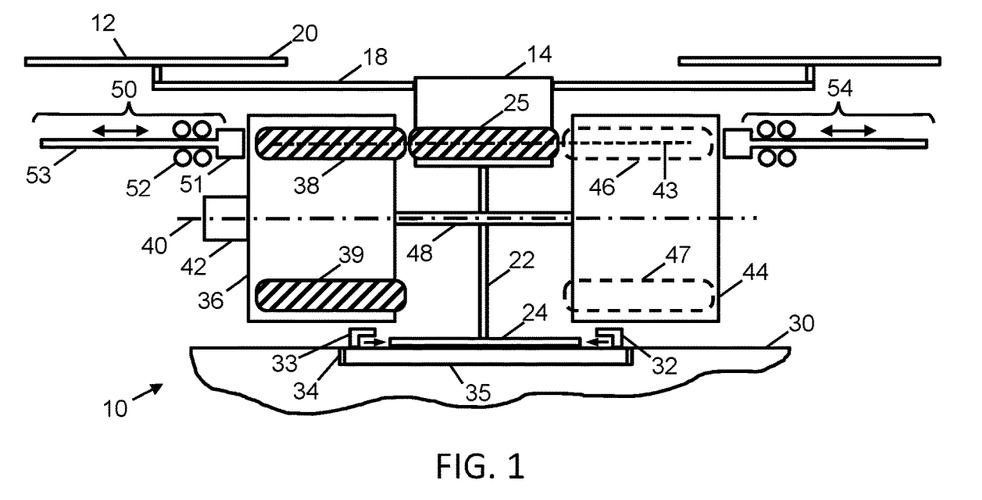
FIG. 1 is a front sectional view of a drone battery exchange and charging system, according to an embodiment of the present invention.

Referring to FIG. 1, a BECS 10 is shown in which a drone 12 has landed. The parts of the drone 12 shown are the body 14, rotor arms 18, rotors 20 and distal side of the landing gear including leg 22 and skid 24. The body 14 of the drone 12 carries a battery module 25.

The drone 12 is landed on an upper surface of the platform 30 of the BECS 10. There may be locking mechanisms 32, 33 included as part of the platform 30, which move inwards in the direction of the arrows to lock the skid 24 in place on the platform. Alternately, the locks may have a screw-like twist or other mechanism that matches the drone's landing gear to ensure a lock after the drone has descended and landed ready for the battery exchange.

Optionally, the platform 30 includes a recess 34 in which is mounted a movable pad 35 having an upper surface on which the drone 12 lands. After the drone 12 has landed, the movable pad 35 can be moved by actuators to finely adjust the position of the drone to align it, if necessary, in the BECS 10. The adjustable pad 35 may be translated in two orthogonal directions, raised and lowered, or rotated back and forth by about, for example, a centimeter. Alternatively, the drone lands on a pad, which, for example, is at the top of an oblong shaped (post/pole) piece of plastic or other solid material, which protrudes upwards towards the drone. This pole is, for example, the male end of a connector, and has a set of slightly twisting grooves around a circular or part circular top end of the pole. These grooves interlock with a similar but opposite mechanism on the drone, which is the female end of the connector. As the drone lands these two interlocking pieces of the connector automatically come together as the drone twists around the landing pole to fit snugly in place, now ready for the battery exchange. To summarize, the drone auto aligns as it drops onto the post and the slight engraved or protruding curves direct and guide it, as it slides into the perfect fixed position, ready to conduct the battery exchange.

The BECS 10 includes a first battery holder 36, which is configured to house multiple battery modules 38, 39 that are similar to the battery module 25 in the drone 12. The battery modules 38, 39 and other similar battery modules are housed in similar docking bays in the first battery holder 36. The first battery holder 36 may be a cylinder or carousel, for example, that rotates about a horizontal axis 40. The battery holder 36 may be rotated by a motor 42, for example, so that any one of the battery modules 38, 39 or others align with the battery module 25 in the drone 12. The battery module 38 in the battery holder 36 and the battery module 25 in the drone 12 are aligned on a common horizontal axis 43. This alignment on the common horizontal axis 43 is made possible by the choice of dimensions of the BECS 10 relative to the drone 12, and optionally because the drone 12 may have its position finely adjusted after it has landed on the platform 30.

The BECS 10 also includes a second battery holder 44, which is configured to house multiple battery modules that are similar to the battery module 25 in the drone 12. For example, the battery modules may be housed in docking bays 46, 47. Similar docking bays are present in the first battery holder 36. The second battery holder 44 may also be a cylinder or carousel, for example, that rotates about the horizontal axis 40. The second battery holder 44 may be similar or identical to the first battery holder 36. The second battery holder 44 may be directly connected to the first battery holder 36 by a rigid shaft 48, so that both the battery holders 36, 44 rotate together, and so that a docking bay in one and a battery module in the other are aligned in pairs. For example, the battery module 38 in first battery holder 36 may be aligned on the common horizontal axis 43 with the battery module 25 in the drone 12 and the docking bay 46 of the second battery holder 44.

In other embodiments, the rigid shaft 48 is not present, the battery holders 36, 44 have their own separate drive motors, and the BECS 10 includes sensors and markers that allow any freshly charged battery module in one of the battery holders 36, 44 to be aligned with a vacant docking bay in the other of the battery holders on the common horizontal axis 43, and with a depleted battery module 25 in the drone.

In normal operation, the drone 12 will land on the BECS 10 when it needs a replacement battery module, i.e. when its battery module 25 is depleted of charge to such an extent that it would risk running out of charge if the flight of the drone continued. In order to exchange the battery modules, the BECS 10 includes a mechanism 50 that pushes a freshly charged battery module 38 from the first battery holder 36 into the drone 12, while at the same time the freshly charged battery module 38 pushes on the depleted battery module 25 in the drone, moving it into the docking bay 46 of the second battery holder 44. The depleted and fresh battery modules will be in contact throughout most of the motion of the mechanism 50. Both battery modules are moved together in one movement for optimal efficiency of the process. In some embodiments, when the drone 12 lands and is directed to the BECS 10, the BECS can quickly, optimally in less than one minute, inject the drone with a fresh battery module.

The mechanism 50 may include, for example, a piston 51 and a set of wheels 52 engaged with a shaft 53 of the piston to move the piston back and forth in the direction of the arrow. The wheels 52 may be gear wheels and the shaft 53 may include a rack that engages with the gears of the wheels, for example. In other embodiments, the wheels 52 may have a rubber surface and may be sprung against the shaft 53.

Also present in the BECS 10 is a second mechanism 54, similar to mechanism 50. Mechanism 54 pushes a freshly charged battery module from a docking bay of the second battery holder 44 into the drone 12, while at the same time the freshly charged battery module pushes on the depleted battery module in the drone, moving it into a docking bay of the first battery holder 36.

The mechanism 50 and/or 54 may also include, for example, a push and or pull mechanism powered by air pressure, or operated by air movement or by the pressure or exhaustion of air or a vacuum of air pressure. A pneumatic force of air could also propel and inject the fresh battery module(s) into the drone and push and/or pull the empty battery into the docking bay 46, where the vacant charging cylinder of the second battery holder is awaiting an empty battery. Where the battery modules are pulled, hooks or seals may be used to temporarily attach the piston 51 to the battery module during the pulling motion. Hooks or seals may also or instead be used to temporarily attach, around the spent battery, the piston 51 to the freshly charged battery module to pull it into the drone. In other embodiments, hydraulic techniques may be used for activating the mechanisms 50, 54.

Both the battery holders 36, 44 have battery charging capabilities so that they can charge the depleted battery modules 25 pushed out of multiple different drones 12, and so that when a drone 12 arrives at the BECS, there is a freshly charged battery module 38 ready for insertion in the drone. Half of the docking bays 46, 47 and others in both the battery holders 36, 44 are vacant, ready to store, recharge and then move the battery modules, as required. Typically, exactly half of those vacant docking bays are vacant so that they can receive the empty battery modules from the landing drones. However, in some embodiments of the BECS, there may be fewer than half the docking bays vacant. For example, as few as one vacant docking bay may be present as there only ever needs to be one location available for an arriving depleted battery module. In this way, more battery modules may be charging at the same time.

Once a depleted battery module 25 has been received in a battery holder, it begins charging, and it may continue to charge as the battery holder rotates. The rotation function of the battery holders 36, 44 is important so that another drone that lands on the BECS 10 can be quickly serviced with a freshly charged battery module.

Figure 2:
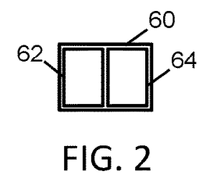
FIG. 2 is an end view of a battery module, according to an embodiment of the present invention.

The battery modules 25, 38, 39 may be single batteries or may include multiple batteries. They may include a cartridge for holding the battery or batteries. For example, FIG. 2 shows an end view of a battery module 60 that includes two batteries 62, 64. The batteries may be Li-ion or may have other types of rechargeable battery chemistry. Battery cartridges that hold the battery sets may provide a thin, partial or complete casing, which is of low enough friction to allow movement of the battery modules along a track or equivalent. The same may apply to the outer surface of the battery modules if they are individual batteries.

Referring back to FIG. 1, the ends of the battery modules may be rounded or partially rounded so that they could come into alignment more easily than if the ends were square. For example, there may be some variation in the positioning of the drone 12 as it lands, and there may be an opportunity for the freshly charged battery module 38 and the depleted battery module 25 to touch each other during the landing. The end surface area of the battery modules 38, 25 may therefore be reduced from square to lessen the chances of the battery modules getting snagged on each other, but only by as much as to still allow the battery modules to push against each other. For example, the edges of the battery modules may be rounded to leave a small flat square (e.g. 13 mm) in the middle of each end. The flats will then line up with each other, providing a stable interface for pushing the battery modules through, but also making it easy for the battery modules to disengage from each other after touching.

The battery modules in the drone 12 may be projecting out of the body 14, and the battery modules 38 and others may project out of the battery holders on the side facing the drone. This is so that the drone has some clearance between its body 14 and the battery holders 36, 44 when it lands on and takes off from the BECS 10.

Figure 3:
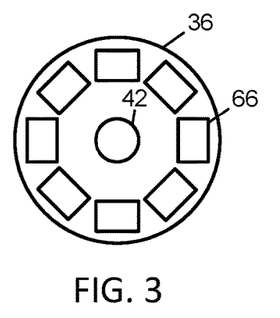
FIG. 3 is a side view of a battery holder of the drone battery exchange and charging system, according to an embodiment of the present invention.

Referring to FIG. 3, a side view of the first battery holder 36 is shown, with motor 42 and docking bays 66. The first battery holder 36 stores eight battery modules 38, as does the second battery holder 44. In other embodiments, the battery holders may each have docking bays for 1-10 or more battery modules. In yet other embodiments the BECS may be configured to change two battery modules at a time. For example, there may be some drones that use two battery modules or more, in a twin configuration or more, to power them. In these cases, the battery holders will have pairs of docking bays side by side, the pairs arranged in a circle around the battery holder.

Figure 4:
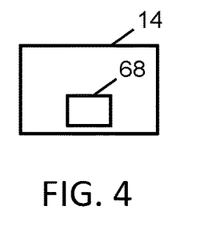
FIG. 4 is a side view of a drone body showing an opening for the battery module, according to an embodiment of the present invention.

Referring to FIG. 4, a side view of the drone body 14 is shown, with an aperture 68 for allowing the battery module 25 to be inserted and removed from the drone 12. A similar aperture can be found on the opposite side of the drone body 14, so that the battery module 25 can be inserted and removed from both sides of the drone 12. The drone bodies 14, 70 are configured to retain a battery module 25 while in flight, enable ejection of the battery module when depleted, and receive a freshly charged battery module.

Figure 5:
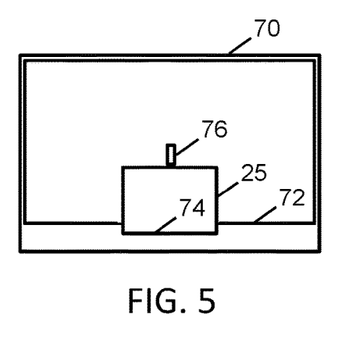
FIG. 5 is a side sectional view of a drone body showing a channel for the battery module, according to an embodiment of the present invention.

Referring to FIG. 5, a side sectional view of another drone body 70 is shown in which the base 72 has a recess or track 74 in which the battery module 25 slides. To help retain the battery module 25 in the track 74, there may be a guide rail 76 attached to the structure of the drone body 70 and located above the battery module 25.

When the freshly charged battery module 38, the depleted battery module 25 and the vacant docking bay 36 are aligned on the common horizontal axis 43, there may be tracks in the battery holders 36, 44 that align so that they are level with the track 74 in the drone body 70. The tracks in the battery holders 36, 44 have the same or similar width to the track 74 in the body 70. The ends of the track 74 and the tracks in the battery holders 36, 44 may be widened and/or lowered so as to help guide the battery modules from one track to the next.

Figure 6:
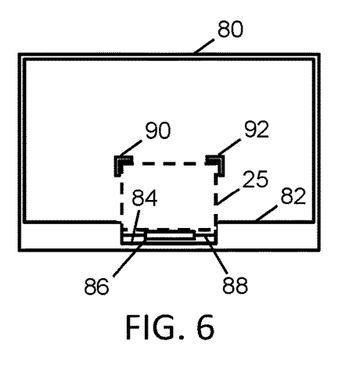
FIG. 6 is a side sectional view of a drone body showing a roller bearing for the battery module, according to an embodiment of the present invention.

Referring to FIG. 6, a side sectional view of another drone body 80 is shown in which the base 82 has a recess 84 in which the battery module 25 slides. Mounted in the recess 84 is a set of roller bearings 86 that rotate on spindles 88. This allows the battery module 25 to slide with less friction in and out of the body 80. To help retain the battery module 25 in the recess 84, there may be guides 90, 92 attached to the structure of the drone body 80 and located around the upper side edges of the battery module 25. There may also be similar roller bearings in the battery holders 36, 44 that align so that they are level with the roller bearings 86 in the drone body 80.

Figure 7:
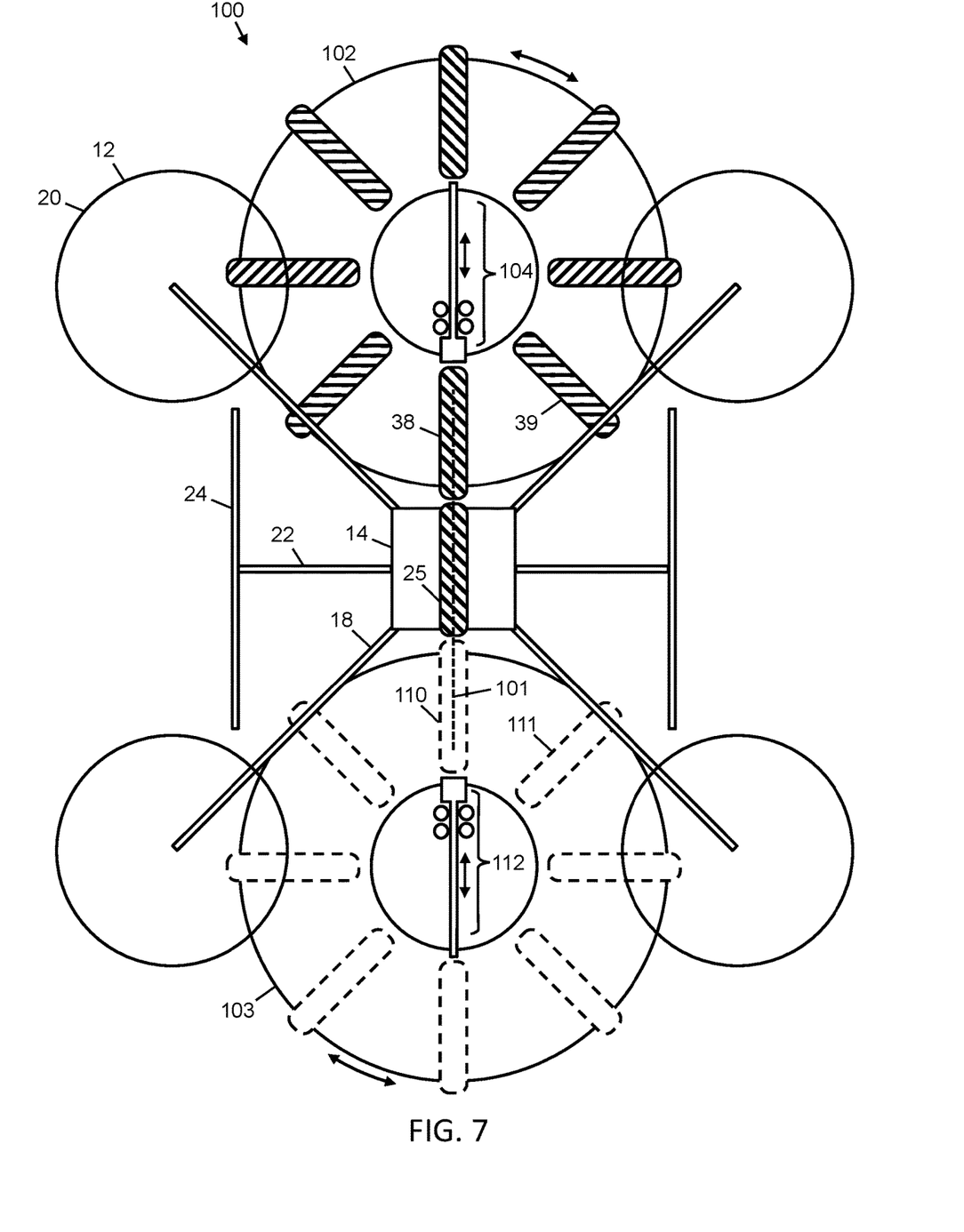
FIG. 7 is a top sectional view of another drone battery exchange and charging system, according to an embodiment of the present invention.

Referring to FIG. 7, an embodiment of the BECS 100 is shown in which the battery holders 102, 103 are arranged to rotate in a horizontal plane about different vertical axes. The parts of the drone 12 shown are the body 14, rotor arms 18, rotors 20 and landing gear including legs 22 and skids 24. The body 14 of the drone 12 carries a battery module 25. Alternatively, in another embodiment, battery holders 102 and 103 could be arranged to rotate in a vertical plane about different horizontal axes. Relative to the drone 12, each battery holder may therefore be arranged to rotate about any of three orthogonal axes.

The first battery holder 102 of the BECS 100 is configured to house multiple battery modules 38, 39 and others that are similar to the battery module 25 in the drone 12. The battery modules 38, 39 and other similar battery modules are housed in similar docking bays in the first battery holder 102. The first battery holder 102 may be a cylinder or carousel, for example. The battery holder 102 may be rotated by a motor, for example, so that any one of the battery modules 38, 39 or others align with the battery module 25 in the drone 12. The battery module 38 in the battery holder 102 and the battery module 25 in the drone 12 are aligned on a common horizontal axis 101. This alignment on the common horizontal axis 101 is made possible by the choice of dimensions of the BECS 100 relative to the drone 12, and optionally because the drone 12 may have its position finely adjusted after it has landed on the platform of the BECS. Also included in the first battery holder 102 is a mechanism 104, similar to mechanism 50, for pushing a freshly charged battery module 38 out of the first battery holder and into the drone 12.

The second battery holder 103 of the BECS 100 is configured to house multiple battery modules that are similar to the battery module 25 in the drone 12. For example, the battery modules may be housed in docking bays 110, 111 and so on. The second battery holder 103 may also be a cylinder or carousel, for example. The second battery holder 103 may be similar or identical to the first battery holder 102. Also included in the second battery holder 103 is a mechanism 112, similar to mechanism 50, for pushing a freshly charged battery module out of the battery holder and into the drone 12.

The second battery holder 103 may be directly connected to the first battery holder 102 by gears, so that both the battery holders 102, 103 rotate together, and so that the a docking bay in one and a battery module in the other are aligned in pairs. For example, the battery module 38 in first battery holder 102 may be aligned on the common horizontal axis 101 with the battery module 25 in the drone 12 and the docking bay 110 of the second battery holder 103.

In other embodiments, the gears are not present, the battery holders 102, 103 have separate driving motors, and the BECS 100 includes sensors and markers that allow any freshly charged battery module in one of the battery holders 102, 103 to be aligned with a vacant docking bay in the other of the battery holders on the common horizontal axis 101.

Figure 8:
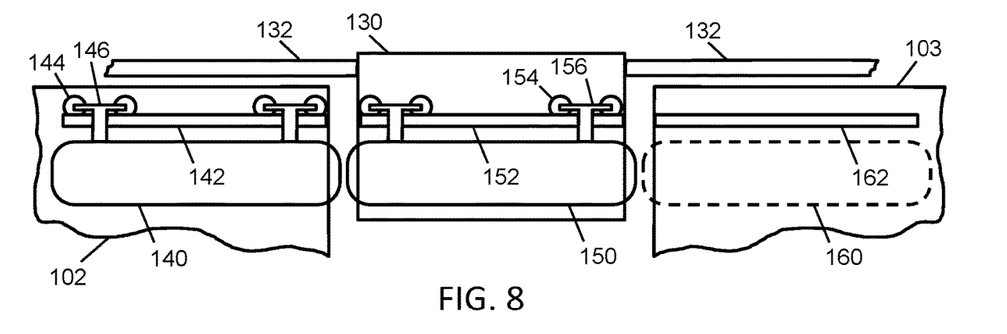
FIG. 8 is a partial front sectional view showing a rail system for a drone battery exchange and charging system, according to an embodiment of the present invention.

Referring to FIG. 8, a rail system is shown for the movement of the battery modules. A drone 130 with its rotor arms 132 is shown between the two battery holders 102, 103 that rotate in a horizontal plane. Battery module 140 is suspended from rail 142 in the battery holder 102, by wheels 144 that are attached to the battery module 140 by supports 146. Battery module 150 is suspended from rail 152 in the drone body, by wheels 154 that are attached to the battery module 150 by supports 156. The wheels 144, 154 sit in or on their respective rails, and are arranged in pairs with a gap that is wide enough to straddle the gap between the rails 142, 152. Above the docking bay 160 in the battery holder 103 there is another rail 162, which is aligned with the rails 142, 152. When the freshly charged battery module 140 is pushed into the drone 130, the depleted battery module 150 moves into the docking bay 160, both battery modules 140, 150 travelling along the rails. This rail system facilitates an easy, fluid, low resistance movement of the battery modules 140, 150.

The battery modules 140, 150 may include batteries that are held inside a plastic framework structure that wraps around the battery semi-permanently. The supports 146, 156 may be mounted on the upper side of the plastic framework.

The rail system may include small metal rail tracks, for example, that are permanently built into the top of the battery holders 102, 103 and in the body of the drone 130. The rail system may have curved entry points to facilitate the transition of a battery module from one section of rail to another.

Figure 9:
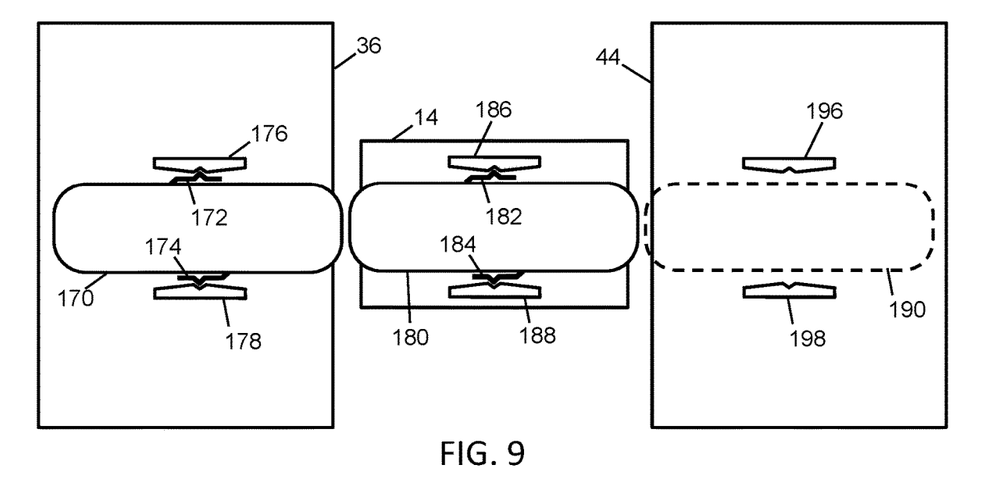
FIG. 9 is a partial top sectional view showing electrical contacts for a drone battery exchange and charging system, according to an embodiment of the present invention.

Referring to FIG. 9, a partial top sectional view of an embodiment of the BECS 10 is shown. In this, the battery modules trigger locking mechanisms, as they slide into place, whether in the drone body 14 or one of the battery holders 36, 44. Battery module 170 has metal electrical contacts 172, 174 that project from the sides of the battery module. These contacts 172, 174 are sprung so that they can move in and out relative to the sides of the battery module 170. Included in the structure of the battery holder 36 are two posts 176, 178 having recesses into which the contacts 172, 174 project when the battery module 170 is in place in the battery holder. The recesses provide electrical connections between the battery module 170 and the battery holder 36 so that charging current can be supplied to the battery module. In this case, the sprung contacts 172, 174 and the corresponding recesses in the posts 176, 178 provide both mechanical retention of the battery module 170 and electrical connection to it while it is in the battery holder 36.

In a similar way, battery module 180 has metal electrical contacts 182, 184 that project from the sides of the battery module. These contacts 182, 184 are sprung so that they can move in and out relative to the sides of the battery module 180. Included in the structure of the drone body 130 are two posts 186, 188 having recesses into which the contacts 182, 184 project when the battery module 180 is in place in the drone. The recesses provide electrical connections between the battery module 180 and the drone so that current can be supplied from the battery module to the drone. In this case, the sprung contacts 182, 184 and the corresponding recesses in the posts 186, 188 provide both mechanical retention of the battery module 180 and electrical connection to it while it is in the drone.

The battery holder 44 is shown with vacant docking bay 190, ready to receive depleted battery 180. Included in the structure of the battery holder 44 are two posts 196, 198 having recesses into which the contacts 182, 184 project when the battery module 180 is pushed into place in the battery holder 44. The recesses provide electrical connections between the battery module 180 and the battery holder 44 so that charging current can be supplied to the battery module 180. In this case, the sprung contacts 182, 184 and the corresponding recesses in the posts 196, 198 provide both mechanical retention of the battery module 180 and electrical connection to it while it is in the battery holder 44.

The posts with recesses and the electrical contacts allow the battery modules to click into place in either the drone or the battery holders. They are shaped so that once the projection on the electrical contact passes the edge of the recess, the battery module is dragged onwards a little further by the spring-loaded contact forcing the projection on the contact into the valley of the recess. As such, the final locations of the removed depleted battery module 180 and the freshly charged battery module 170 can be chosen so that there is a small gap between them, providing some clearance for take off and landing.

In other embodiments, the electrical connections and the mechanical retaining mechanisms or clips may be separate from each other.

In other embodiments, spring loaded electrical and mechanical contact points may be built into the base of the drone body, and the metal contacts may be incorporated on the bottom of the battery modules. Similar spring loaded electrical and mechanical contact points may be built into the bases of the docking bays.

Figure 10:
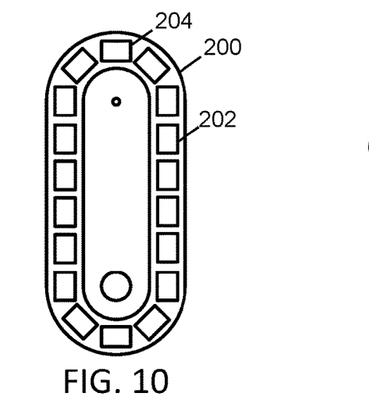
FIG. 10 is a partial side view of an oval battery holder, according to an embodiment of the present invention.

FIG. 10 shows another example of a battery holder 200, in which the battery modules 202 and docking bays 204 move around the holder in a vertical oval path. The battery modules and docking bays may move around a track in the holder, or a system of rails, for example. The uppermost docking bay 204 (or battery module, as the case may be) is the one that is aligned with the battery module in the drone. This embodiment allows for a larger number of battery modules to be accommodated compared to a cylindrical battery holder having the same diameter as the ends of the oval. In other embodiments, the path of the oval may be in a horizontal plane.

Figure 11:
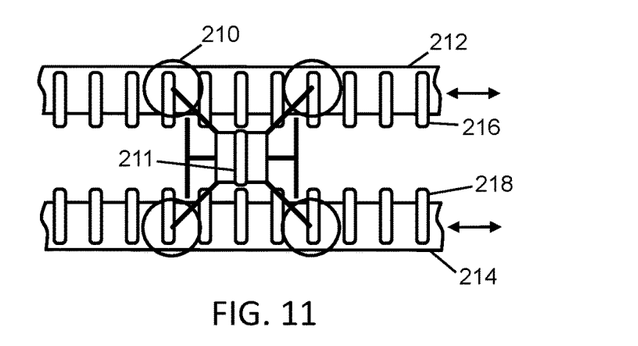
FIG. 11 is a partial schematic top view of a noncircular drone battery exchange and charging system, according to an embodiment of the present invention.

FIG. 11 shows another example of a BECS with noncircular battery holders. A drone 210 with battery module 211 is shown landed on the BECS, which has two battery holders 212, 214. The drone 210 lands in the same position each time it needs a battery exchange. The battery holders 212, 214 then move, or have previously moved, the locations 216, 218 of freshly charged battery modules and vacant docking bays such that one freshly charged battery module and one empty docking bay align with the drone's battery module 211. A mechanism (e.g. 50, FIG. 1) is then activated to exchange the battery module in the drone for a freshly charged one. A similar mechanism is also present at the other side of the BECS, for the other battery holder. In other embodiments, where there is room for more than one drone to land on the BECS at the same time, there may be mechanisms 50 at each drone position, again for both battery holders 212, 214.

Figure 12:
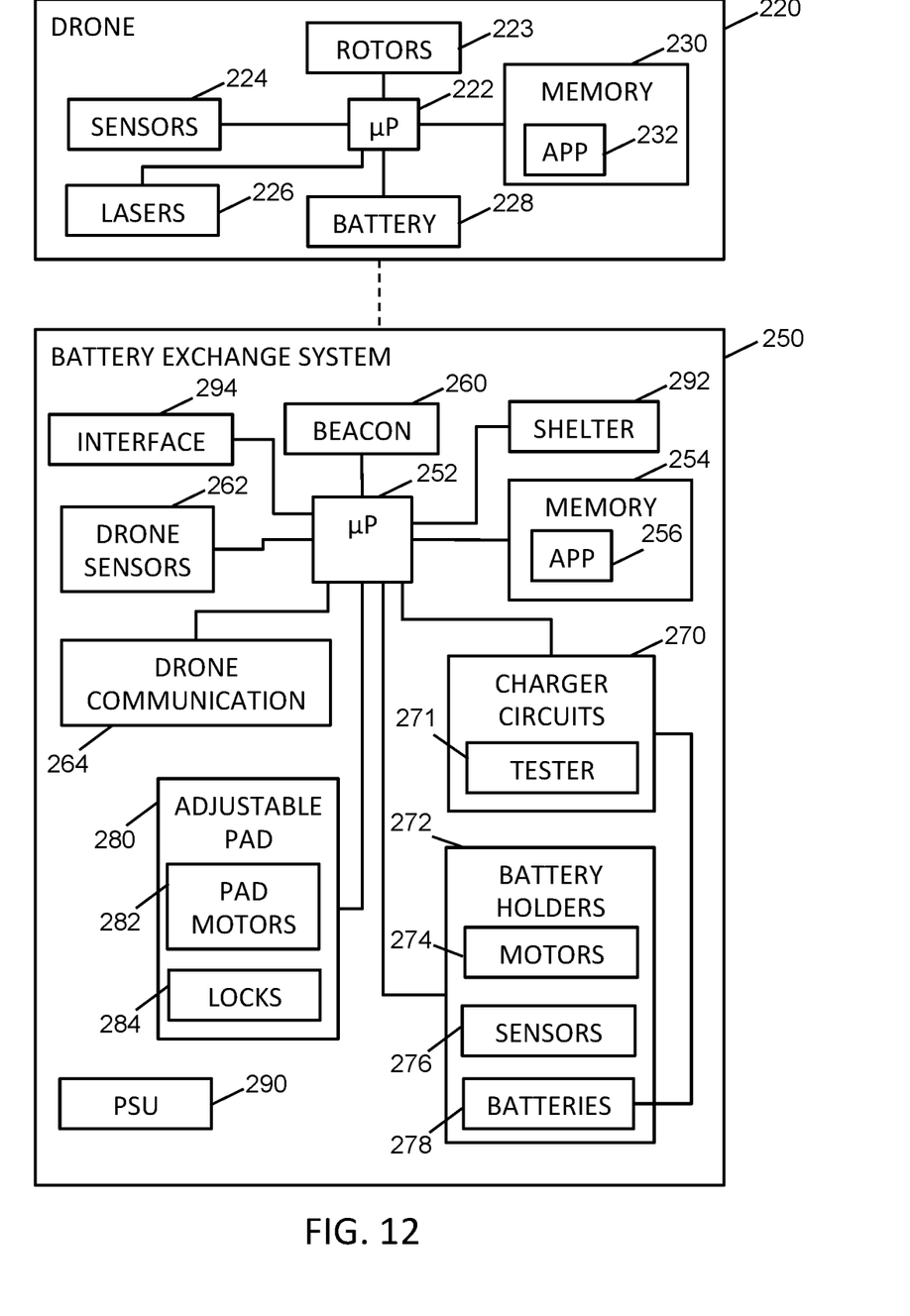
FIG. 12 is a schematic block diagram of a drone and a battery exchange and charging system, according to an embodiment of the present invention.

FIG. 12 shows the main modules of an exemplary drone 220 and an exemplary BECS 250. The drone 220 includes processor 222, rotors 223, sensors 224, lasers 226 and a battery module 228. The processor is connected to a computer readable memory 230, which stores computer readable instructions in the form of an application 232. The application may include one or more algorithms for control of the drone 220, a flight computer, navigational software, a battery monitor, a BECS location program a lock control application. When the processor 222 executes the computer readable instructions, it causes operation of the various functions or modules of the drone.

The BECS 250 includes a processor 252 connected to a computer readable memory 254, which stores computer readable instructions in the form of an application 256. The application 256 may include one or more algorithms for control of the BECS 250. When the processor 252 executes the computer readable instructions 256, it causes operation of the various functions or modules of the BECS 250. For example, the application may include functions for controlling the landing pad, the lock, the operation of the battery module pushing mechanisms, the rotation of the battery holders, the registration of the battery holders in position, etc. Some of the software functions may be shared between the drone 220 and the BECS 250, or duplicated.

The BECS 250 also includes a beacon 260; drone sensors 262 for sensing the position of the drone; a drone communication module 264; charger circuits 270 for charging the battery modules; battery tester circuits 271 in or separate from the charger circuits; battery holders 272 with motors 274, sensors 276 and battery modules 278; an optionally adjustable landing pad 280 with pad motors 282 and locking mechanisms 284; and a power supply unit 290 for supplying power to the charging circuits and other modules of the BECS. Also part of the BECS 250 is a weather-proof barrier or other shelter 292, that opens as it senses a drone approaching, to enable operations of the drone in adverse conditions, e.g. rain, snow and sleet. A communications interface 294 is also present for communicating with a BECS management system or master control centre. For example, data relating to the functioning of the BECS may be transmitted to the management system, including the state of charge and state of health of the battery modules, and the number of battery exchanges made.

The beacon 260, drone sensors 262 and drone communication module 264 may form a close-in location guidance system for landing the drone 220 on the BECS 250. The lasers 226 may form part of a laser guidance system for landing the drone 220. The BECS 250 may also have laser and other short range location technology to guide the drone into the exact landing spot. The drone 220 may engage with a Bluetooth™ type connectivity to the BECS 250 to support close-in location capability and ensure that the drone lands in exactly the right landing spot in order to begin the battery module exchange.

B. Exemplary Use

A drone in an inventory of a fleet of drones is out flying a mission. It starts out on a flight path with a fully charged set of batteries which may enable 40 minutes or more of flight, for example. The drone has 'battery life remaining' measurement technology on board, which gives the individual drone and the control centre an understanding of how many minutes of flight are left, and when the drone must land to exchange depleted batteries for fully charged batteries. The drone has a flight computer and navigational software onboard to keep track of its exact location and the location of each BECS in the network, and specifically the BECS along the drone's flight path.

The drone constantly or regularly runs an algorithm that informs the drone in real time both how many minutes of battery life are left on board and how many minutes the drone is away from the most convenient BECS. When the drone is forecasted to have less than say 5 minutes of battery life left after subtracting the estimated flight time to get to the nearest BECS, the drone auto instructs itself to fly immediately to the nearest BECS. The drone approaches the BECS and picks up the additional homing beacon from the BECS to guide the drone close to the landing surface. When within say 3 meters of the BECS, the laser system activates on the BECS to further guide the drone onto the landing pad with millimeter distance accuracy.

As the drone lands on the landing pad of the BECS, it automatically comes to a resting position and is locked into place. A robotic arm or other mechanism is then engaged and moves a stored, fully charged battery into the drone. The drone receives the new battery from either of the two battery cylinders. At the same time, the depleted battery is ejected from the drone into the other of the battery cylinders.

After the fresh batteries have been moved into the drone and the depleted batteries have been pushed into the opposite battery cylinder, both battery cylinders move a partial rotation to get ready for the next battery exchange. This continues until the one cylinder is full and the original cylinder is empty. At this time all the batteries in the receiving cylinder have had a full rotational cycle of charging and are now fully charged and ready to be re-injected into the next series of drones that need fresh batteries.

It takes about 1 hour to fully recharge a set of batteries, so if a cylinder holds 8 sets of batteries the BECS should be able to serve approximately 8 drones per hour. In a BECS that holds 8 sets of batteries, after 8 drones have been serviced, the cylinder providing the fresh batteries switches to receiving spent batteries, and the cylinder receiving the spent batteries switches to providing fresh batteries. After another 8 drones have been serviced, the cylinders switch functions and the cycle starts all over again. This principle applies for cylinders with a set of 6, 8 10, 12 or other number of batteries. When one cylinder is empty the other cylinder takes over and repeats the process. This method allows the batteries to charge and be deployed in a continuous, extended manner.

The two cylindrical wheels may spin in lockstep as they pass the batteries back and forth or they may move counter to each other. Just one robotic arm is required for the 12 o'clock position at each wheel, to eject the fresh battery into the drone and in turn move the drone's depleted battery out of the other side into the other cylinder. When the switching of functions of the cylinders takes place, the robotic arm that has been in use will disengage, while the other arm will engage.

After the battery exchange, the drone is free and clear and in a position to take off. Once free and clear the drone will automatically start its propeller system and fly off to its next programmed destination.

As the fresh batteries are injected with the help of a robotic arm into the drone, the new battery automatically pushes on the depleted drone battery and ejects it seamlessly into the receiving cylinder. This way the depleted battery begins to charge and will continue charging until it has made its way around the entire cylinder, or before. When it has made its way all the way round, the depleted battery has been fully recharged and is ready to be re-injected into another drone, from the opposite side of the drone. Depending on the operating parameters selected, it is possible that as soon as a fresh battery module has been inserted into a drone, and the drone has taken off, then another freshly charged battery is moved into place for immediate deployment to a subsequent drone. For example, if a minimum limit for the battery exchange time were set to one minute, a BECS would in theory be able to serve 60 drones per hour, and would employ battery holders storing 60 battery modules. This allows for standby availability of a freshly charged battery, which is important as the BECS may be on a remote rooftop for example, and needs to continue to operate flawlessly for many months at a time.

Figure 13:
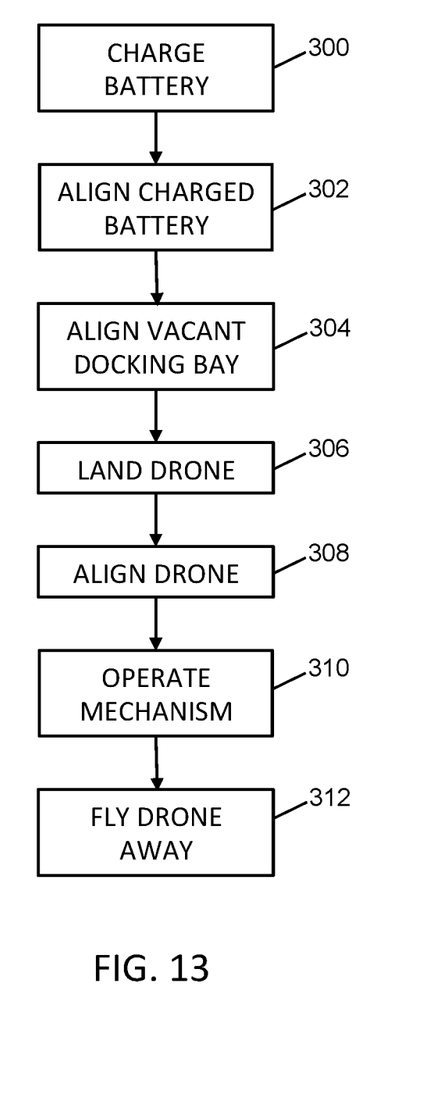
FIG. 13 is a flowchart for exchanging a drone battery, according to an embodiment of the present invention.

FIG. 13 shows an exemplary method of exchanging a drone battery. In step 300, a depleted battery module is charged in a docking bay in a first battery holder of the BECS. In step 302, the charged battery module is aligned on a common horizontal axis, so that it will be aligned with the depleted drone battery module when the drone lands.

In step 304, a vacant docking bay in a second battery holder is aligned with the common horizontal axis. Steps 302 and 304 may be performed simultaneously or sequentially, in any order.

In step 306, a drone with a depleted battery module is landed on a surface of the BECS. In step 308, the landed drone is finely aligned, if necessary, so that there is a sequence on the common horizontal axis of one of the docking bays of the first battery holder that hosts a freshly charged battery module, the depleted battery module in the drone, and an empty one of the docking bays of the second battery holder.

In step 310 a mechanism is operated that pushes the freshly charged battery module into the drone, and simultaneously causes the depleted battery module to enter the aligned docking bay of the second battery holder. After this, the drone can be flown away in step 312.

C. Variations

The mechanisms 50, 54, 104, 112 may be replaced with other power mechanisms in other embodiments, provided that they can simultaneously place a freshly charged battery module in a drone and move a depleted battery module from the drone into a vacant docking bay for recharging. For example, the mechanism may include a mechanical arm and/or a pulley system or equivalent to push the battery modules into place.

In another example, small rubber wheels may be built in to the side of the docking bays just above the rail system to grab onto a bar or rod that runs along the top of the wheels 144 and move the battery modules back and forth. Motors for these rubber wheels are in both battery holders but not the drone. This will also replace the need for a piston mechanism. These rubber wheels may project the battery modules back and forth as required.

In other embodiments, the mechanisms 50, 54, 104, 112 may be replaced with other power mechanisms that pull the battery modules into place. For example, the mechanisms may include a vacuum system or a hook system.

The rotating cylindrical battery holders 36, 44, 102, 103 may be other shapes, e.g. in the shape of a square, pentagon, hexagon, octagon, decagon etc. Besides the oval form, other non-circular battery module paths may be employed in other battery holders, including convoluted conveyor paths.

Numbers of docking bays, charging rates, battery capacities, duration of the battery module exchange process, and numbers of drones to be served may be selected or modified to optimize the BECS depending on the preferred parameters of the system.

A spring mechanism may be used in the drone that would allow the freshly charged battery module to be pushed a little further through the drone, to get the depleted battery module fully out, then retract into a central position.

In some embodiments, the battery holders may be fixed, i.e. non-rotatable, if they only house one battery module. In other embodiments, there may be multiple pairs of such fixed battery holders in a BECS, the drone being able to land between any one of the pairs depending on which has a freshly charged battery module.

In an alternate embodiment, a single battery holder is used to first retract the depleted battery module from the drone, rotate into another position, and then push a freshly charged battery module into the drone. The battery holder may be a cylinder with four or any other number of docking bays. In this embodiment, the piston mechanism or equivalent will need to be operated twice, in push and pull modes. If the drone needs two battery modules replaced, one on each side, then the drone will turn round after the first battery module is replaced so that the second battery module can be replaced by the same cylinder. In one embodiment, a battery holder may be on both sides of drone, so that two battery modules can be exchanged at the same time, without the drone needing to turn around. The interface between the piston and the battery module is configured to attach and detach from the battery modules as and when needed, for example using a screw mechanism or a clip mechanism.

An end-of-life solution for dying, un-chargeable batteries may be incorporated. With today's technology, new drone batteries should be able to be fully charged and recharged approximately 500 times before they begin lose their ability to hold a full charge due to the battery cells degrading over time. The docking bays 46, 47 may be connected to a battery tester or testers that are be able to measure the health of the battery, its battery charge level and its ability to fully recharge. Any batteries that have a state of health below a given threshold, i.e. are not able to hold an acceptable minimal charge, will not qualify to be exchanged into a landing drone, and they will be determined to be at their end of life and passed over for drone injection by the rotating battery holders 36, 44. The docking bay housing the dead battery module will skip deploying the battery module into the drone. The battery holder 36, 44 will move round to align, with the drone, the next docking bay with a healthy battery module and load the drone with a healthy battery. These unchargeable battery modules and/or the docking bays will flag themselves as dying and send a notification back to the BECS management system that a dead battery is present and needs to be manually replaced. At this time, removing a dying or dead battery will require a physical, on-site visit to that specific BECS unit location where a technician will remove the dead, unchargeable battery and replace it with a new chargeable battery.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense. In general, unless otherwise indicated, singular elements may be in the plural and vice versa with no loss of generality.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors.

The term "software" includes, but is not limited to, program code that performs the computations necessary for calculating and optimizing user inputs, the reporting and analysis of product specific data, displaying information, and, managing of input and output data.

The term "firmware" includes, but is not limited to, program code and data used to control and manage the interactions between the various modules of the system.

The term "hardware" includes, but is not limited to, the physical housing for a computer as well as the display screen, connectors, wiring, circuit boards having processor and memory units, power supply, and other electrical or electronic components.

The term "module" can refer to any component in this invention and to any or all of the features of the invention without limitation. A module may be a software, firmware or hardware module, and may be located in a user device or a server.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main function of the invention. Modules may be divided into constituent modules or combined into larger modules. All parameters, dimensions, materials, and configurations described herein are examples only and actual values of such depend on the specific embodiment. Accordingly, the scope of the invention is to be construed in accordance with the substance defined by the appended claims.

The invention claimed is:

1. A drone battery exchange system comprising:
   a first battery holder with multiple, movable docking bays each dimensioned to accept a battery module;
   a second battery holder with multiple, movable docking bays each dimensioned to accept a similar battery module, wherein each of said movable docking bays of said first and second battery holders comprises a rail for suspending said battery module;

a surface upon which a drone with a depleted battery module can land, wherein the first and second battery holders and the surface are positioned so that a sequence of one of the docking bays of the first battery holder, the depleted battery module and one of the docking bays of the second battery holder can be aligned on an axis; and a first piston that moves a freshly charged battery module from the aligned docking bay in the first battery holder into the drone and simultaneously causes the depleted battery module to enter the aligned docking bay of the second battery holder.

2. The drone battery exchange system of claim 1 comprising a battery charger that charges uncharged battery modules when they are in the docking bays.

3. The drone battery exchange system of claim 1, comprising a movable pad, wherein the surface is an upper surface of the movable pad and the movable pad moves the drone to align the depleted battery module when the drone is on the surface.

4. The drone battery exchange system of claim 1, comprising one or more locks that lock the drone onto the surface.

5. The drone battery exchange system of claim 1, wherein the first and second battery holders each comprise a cylinder housing the respective docking bays, the cylinders both oriented to rotate about a common horizontal axis.

6. The drone battery exchange system of claim 5, wherein the cylinders are physically connected to rotate in synchronization with each other.

7. The drone battery exchange system of claim 5, wherein the cylinders rotate independently of each other, the system comprising sensors and markers that are used to align the docking bays with the depleted battery module.

8. The drone battery exchange system of claim 5, comprising one or more motors to move the docking bays.

9. The drone battery exchange system of claim 1, wherein the first piston is coupled to wheels that move the piston back and forth.

10. The drone battery exchange system of claim 1, comprising a second piston that moves a second freshly charged battery module from the aligned docking bay in the second battery holder into the drone, and simultaneously causes another depleted battery module in the drone to enter the aligned docking bay of the first battery holder.

11. The drone battery exchange system of claim 1, wherein the first and second battery holders each comprise a cylinder housing the respective docking bays, the cylinders both oriented to rotate about a different vertical axis.

12. The drone battery exchange system of claim 11, wherein the battery module can be suspended using wheels that are supported on the rail.

13. The drone battery exchange system of claim 12, wherein the rail in the aligned docking bay aligns with a further rail in the drone when the drone is on the surface, the further rail first supporting the depleted battery module and then the freshly charged battery module.

14. The drone battery exchange system of claim 1, wherein each docking bay comprises two electrical connectors that connect to electrical terminals on the battery module.

15. The drone battery exchange system of claim 1, wherein each docking bay comprises one or more mechanical retaining clips that hold the battery module in place in the docking bay.

16. The drone battery exchange system of claim 1, wherein the docking bays move on noncircular paths.

17. The drone battery exchange system of claim 1, wherein the drone comprises:
a bay for another similar battery module;
a body with two opposing sides each defining an aperture through which Hall the another similar battery module can pass to enter and exit the bay.

18. The drone battery exchange system of claim 1, wherein the first and second battery holders each comprise a cylinder housing the respective docking bays, the cylinders both oriented to rotate about different horizontal axes.

19. The drone battery exchange system of claim 1, wherein the first piston is pneumatically or hydraulically activated.

20. The drone battery exchange system of claim 1, wherein the first piston pushes the freshly charged battery module from the aligned docking bay in the first battery holder into the drone and simultaneously causes the depleted battery module to be pushed into the aligned docking bay of the second battery holder.

21. A drone battery exchange system comprising:
a first battery holder with multiple, movable docking bays each configured to accept a battery module;
a second battery holder with multiple, movable docking bays each configured to accept a similar battery module, wherein each of the first and second battery holders comprises a rail in each docking bay from which the battery module is suspended;
a surface upon which a drone with one or more depleted battery modules can land, wherein the first and second battery holders and the surface are positioned so that a sequence of one of the docking bays of the first battery holder, one of the one or more the depleted battery modules and one of the docking bays of the second battery holder can be aligned on an axis; and
a first piston that moves a freshly charged battery module from the aligned docking bay in the first battery holder into the drone and simultaneously causes one of the one or more the depleted battery modules to enter the aligned docking bay of the second battery holder.

22. The drone battery exchange system of claim 21, wherein the battery module is suspended using wheels that are supported on the rail.

23. The drone battery exchange system of claim 21, wherein the rail in the aligned docking bay aligns with a further rail in the drone when the drone is on the surface, the further rail first supporting the depleted battery module and then the freshly charged battery module.

24. The drone battery exchange system of claim 21, comprising a second piston that moves a second freshly charged battery module from the aligned docking bay in the second battery holder into the drone, and simultaneously causes a second depleted battery module in the drone to enter the aligned docking bay of the first battery holder.

* * * * *